United States Patent [19]

Gattis et al.

[11] Patent Number: 5,062,136
[45] Date of Patent: Oct. 29, 1991

[54] TELECOMMUNICATIONS SYSTEM AND METHOD

[75] Inventors: Sherri L. Gattis; James L. Rieger, both of Ridgecrest, Calif.

[73] Assignee: The United States of America as represented by the Secretary of the Navy, Washington, D.C.

[21] Appl. No.: 582,267

[22] Filed: Sep. 12, 1990

[51] Int. Cl.$^5$ .................. H04N 1/44; H04N 7/14; H04N 7/12

[52] U.S. Cl. .................................. 380/18; 358/85; 358/426; 358/146; 364/919.1; 379/100

[58] Field of Search ................ 380/9, 10, 18; 358/85, 358/146, 426; 379/100; 364/919.2, 919.1, 919.4

[56] References Cited

U.S. PATENT DOCUMENTS

| | | | |
|---|---|---|---|
| 4,454,593 | 7/1984 | Fleming et al. | 364/900 |
| 4,485,400 | 11/1984 | Lemelson et al. | 358/85 |
| 4,849,811 | 7/1989 | Kleinerman | 379/100 X |
| 4,866,772 | 9/1989 | Schröter | 380/25 |
| 4,893,326 | 1/1990 | Duran et al. | 358/85 X |
| 4,939,767 | 7/1990 | Saito et al. | 358/85 X |
| 4,943,994 | 7/1990 | Ohtsuka et al. | 358/85 X |
| 4,953,196 | 8/1990 | Ishikawa et al. | 358/85 X |
| 4,979,028 | 12/1990 | Minematsu et al. | 358/85 |
| 4,996,594 | 2/1991 | Murayama | 358/85 X |

Primary Examiner—Stephen C. Buczinski
Attorney, Agent, or Firm—Harvey A. Gilbert; Melvin J. Sliwka; Sol Sheinbein

[57] ABSTRACT

A teleconferencing system includes desktop computers, external cameras and peripheral apparatus to allow interconnection of two or more terminals to engage in teleconferencing via digital data networks. A frame grabber interfaces each camera with its computer. Signals output from the computer are encoded and compressed before being input to a telephone line via a modulator/demodulator. A decoder is connected between the modulator/demodulator and the computer for decoding compressed video signals received by the modulator/demodulator means from the telephone line so that the signals may be displayed on a video display connected to the computer.

16 Claims, 1 Drawing Sheet

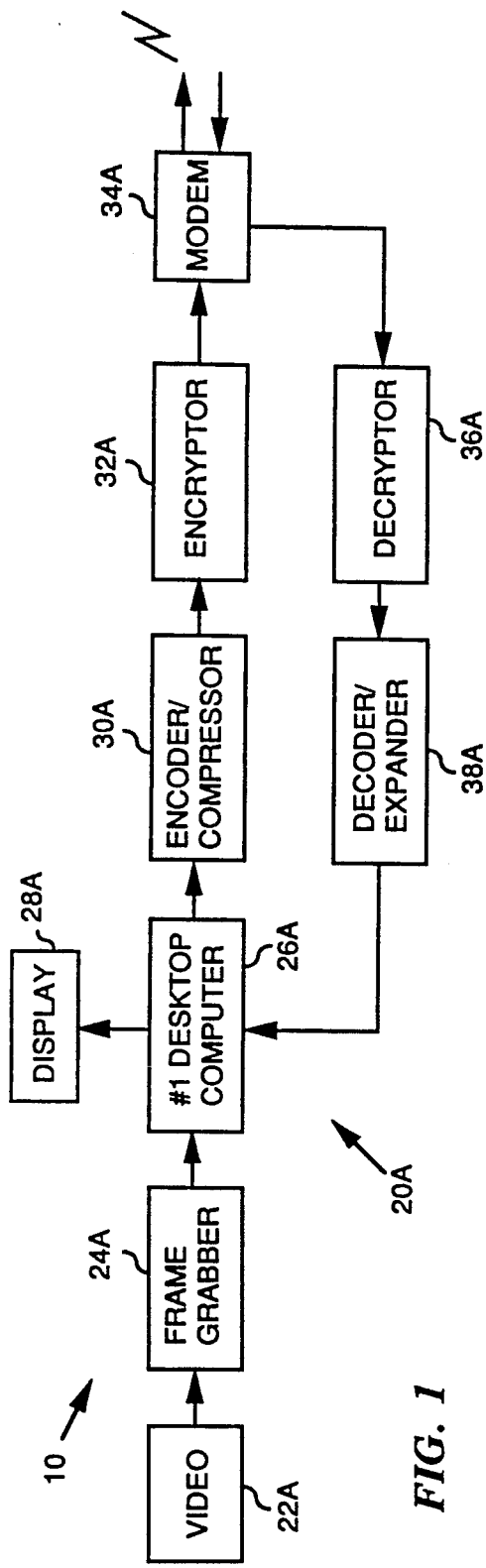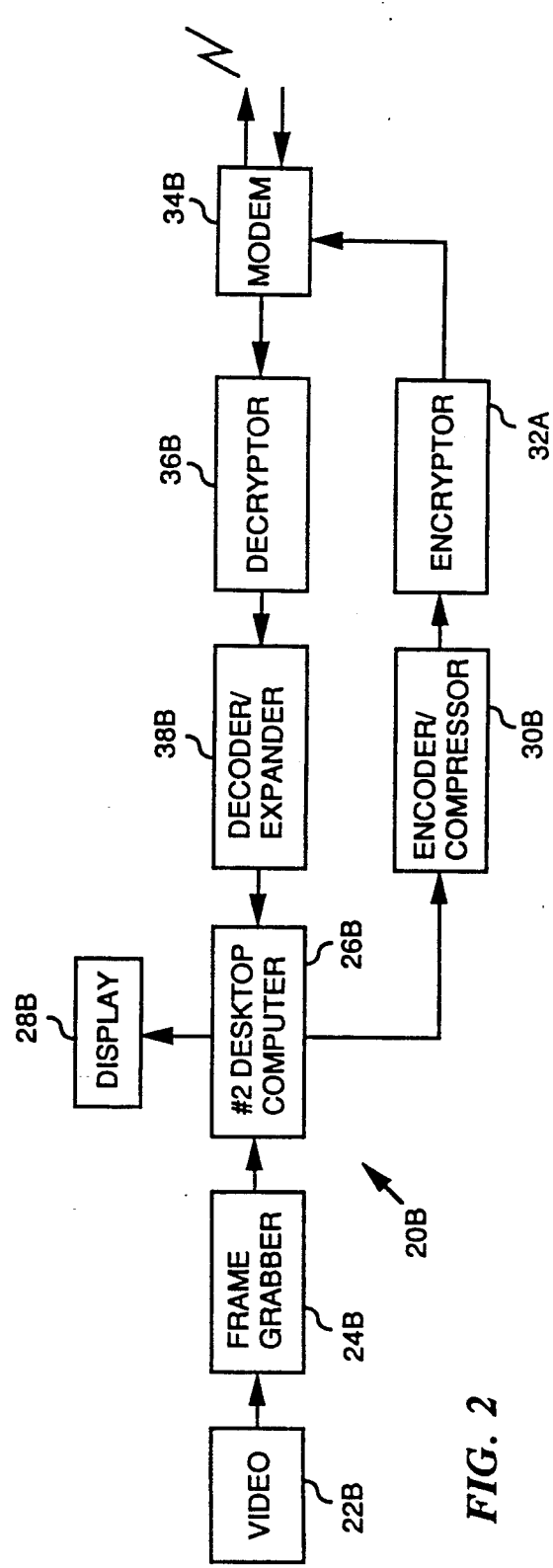
FIG. 1
FIG. 2

TELECOMMUNICATIONS SYSTEM AND METHOD

BACKGROUND OF THE INVENTION

This invention relates generally to telecommunications systems and particularly to terminals for use in teleconferencing networks. Still more particularly, this invention relates to apparatus and methods for adapting compressed digital television signals for use with desktop computers in teleconferencing networks for transmitting and receiving television pictures.

In the United States broadcast television signals conform to standards set by the National Television Standards Committee. Such signals are commonly called NTSC video signals. Currently telecommunications networks require large host computers and individual work stations equipped with monitors and cameras. These systems occupy a large amount of space, are very costly, and are stand-alone items used only for telecommunication purposes. The present invention enables existing desktop computers to be adapted and equipped to accomplish the same results as the currently available systems.

U.S. Pat. No. 4,751,578, issued June 14, 1988 to Reiter et al discloses a system for viewing information on a television screen. The system dials a telephone number to access a central computer system, which then downloads information into a microcontroller to display information such as local railraod schedules, movie theater listings and television programming schedules.

U.S. Pat. No. 4,651,227, issued Mar. 17, 1987 to Yunoki et al discloses a video signal recording apparatus for recording on a magnetic disc signals output from a solid state image pickup device. Yunoki et al. is particularly directed to a video signal recording apparatus having an image pickup section and a recording section incorporated as an integral unit to record a high quality video signal having a high frequency band. The video signal recording apparatus comprises an image pickup section having a plurality of pixels arranged in a matrix and an analogue to digital convertor converts the analog signal produced from the image pickup section to a digital pixel signal which is then stored in a pixel memory.

U.S. Pat. No. 4,736,407, issued Apr. 5, 1988 to Dumas is directed to a computer assisted graphic teleconferencing device. Dumas discloses a computer enhanced telephone conferencing system that provides dial up audio-graphic communications between a plurality of users. Each user has a personal computer specifically programmed to control a programmable modem and a speaker phone. The users are preferably connected by voice grade telephone lines. The computer software controls the speaker phone to turn it off and on at appropriate times to eliminate room noise during transmission or reception of caller graphics during a telephone conversation. Each modem is controlled by the computer to be on line in a silent receive mode status unless transmitting so that the phone lines are monitored at all times. The computer is programmed to ignore all signals on the telephone line unless the signals are preceded by a predetermined identification code indicating that a graphics related signal is being transmitted to another user. Dumas further discloses a system that overlays a computer generated signal onto a NTSC video signal to produce a composite video signal suitable for transmission to a display such as a standard television monitor.

U.S. Pat. No. 4,425,5817, issued Jan. 10, 1984 to Schweppe et al. discloses a system for overlaying a computer generated video signal on an NTSC video signal. Video disc players and video tape players produce NTSC video signals, which are the standard television signals used in the United States. The standard television video signal has a vertical frequency of 59.94 Hz and a horizontal frequency of 15.737 for Khz. However, in general, computers generate a video signal having a vertical frequency of 60 Hz and a horizontal of 15.840 Khz. This incompatibility in the frequencies of NTSC video signals and the computer generated signal has caused difficulties in overlapping the computer generated graphics video signal onto a standard NTSC video signal. Dumas discloses a system that controls a computer to readout a computer generated video signal at the NTSC signal rate.

U.S. Pat. No. 4,402,010 to Vogelman issued Aug. 30, 1983 discloses a digital television signal processing and transmission system. Vogelman is particularly directed to a television signal processing and transmission system using digital techniques for reducing the frequency bandwidth required to transmit such signals. The required bandwidth in television and other scanning systems results from the rate of change of intensity along horizontal strips of the scanned configuration. In television the scanning rate is uniform, and the bandwidth required is that needed to transmit at the fastest rate of change in intensity to obtain satisfactory picture quality. Vogelman discloses a coding and decoding methodology that varies the duration of each scan line and each frame of the assigned transmission such that the band width is optimally utilized at all times. Vogelman accomplishes this optimization by sending only changes in information and content at a rate equal to the maximum rate commensurate with the assigned band width.

U.S. Pat. No. 4,177,462, issued Dec. 4, 1979 to Chung discloses a system that provides computer control of a television receiver display. Chung discloses coupling a microprocessor to a scanning visual display apparatus which enables a highly resolved display to be obtained without inordinate memory requirements. Chung discloses composing substantially simultaneously with each scan the information to be conveyed during the scan.

U.S. Pat. No. 4,156,914, issued May 29, 1979 to Westell discloses a computer image display system in which digitally sampled data generated by an image transducer and processed by a computer is convolved with a gaussian function in a display processor to produce a continuous analog image presentation on a display. Westell is directed to a display system that attempts to produce display artifacts due to aliasing leakage and data quantization which occurs if digital is simply converted into analog intensity values and displayed directly.

SUMMARY OF THE INVENTION

The present invention uses desktop computers, an external camera and one peripheral device to allow interconnection of two or more terminals to engage in teleconferencing via digital data networks. The present invention uses features already present in desktop computers to increase the efficiency of such computers in teleconferencing networks. Two computers interconnected by a data line can at present exchange text and some forms of graphics. With the invention described herein, interconnected computers can exchange standard television images in black-and-white or color, with update rates and resolution variable to fit the desires of the users. The invention may be used in a one-, two-, or many-way ("broadcast") mode. The invention uses a video compression algorithm developed for telemetry, surveying, and survelliance with which it is compatible. Consequently, video signals may be exchanged between the two types of equipment if the data rates are compatible.

The computer operator may send additional non-video data or text interleaved with video information. Depending on the resolution selected, a picture field can be transmitted at a motion rate of as high as one every seven seconds at 9600 baud or every 1.2 seconds at 56 Kbaud, or twice those rates if a split screen is used. Moreover, without breaking the connection, the sending operator can switch from video to high-resolution graphics, standard or nonstandard facsimile ("FAX"), high-speed text, or voice modes at will. Any receiving system equipped with the invention as a peripheral will automatically identify the type of data sent and display or store it appropriately.

The invention can be added as an internal peripheral to many computers, or the invention may be added as a stand alone device which connects to the computer via a serial or parallel interface. An external camera is required for any originating terminal, and an external connection to the display monitor may be required with some systems. As such, the invention can be used as a "dumb" terminal on any large computer system.

The apparatus according to the present invention for adapting video signals to a computer for a telecommunications system, comprises a video input means for forming a standard video signal and a frame grabber connected to the video input means. A computer is connected to the frame grabber to receive the video signal. An encoder is connected to the computer to receive and compress the video signal. A modulator/demodulator interfaces the encoder with a telephone line. The invention may further comprise an encryptor connected between the encoder means and the modulator/demondulator means.

The present invention also may include decoder means connected between the modulator/demodulator means and the computer for decoding compressed video signals received by the modulator/demodulator means from the telephone line. A display is coupled to the computer for displaying the video signals decoded by the decoder means.

BRIEF DESCRIPTION OF THE DRAWINGS

FIG. 1 is a block diagram illustrating apparatus for sending television signals in a teleconferencing network; and FIG. 2 is a block diagram illustrating a system used for receiving television signals in a teleconferencing network.

DESCRIPTION OF THE PREFERRED EMBODIMENT

Referring to FIG. 1, a television teleconferencing system 10 according to the present invention includes a first work station 20A. The work station 20A includes a video camera 22A, which produces video signals indicative of selected objects or individuals. The video camera 22A provides video signals to a frame grabber 24A.

The frame grabber 24A digitizes the video signals and puts them into a form suitable for input to a desktop digital computer 26A.

The digitizing process assigns a brightness level and a color to each pixel in the video signal. The information for each pixel requires 24 bits, and a standard video signal contains about 200,000 pixels. Therefore, the digital signal for each frame in the video signal about $4.8 \times 10^6$ bits. Efficient transmission of such signals without overloading the transmission channel requires the use of a compressed code. A compressed code also reduces the amount of memory required to store each frame. A protocol for transmitting the signals in a compressed code is described subsequently.

The desktop computer 26A has a first output connected to a display 28A and a second output connected to an encoder/compressor 30A. The encoder/compressor 30A preferably produces an output signal at standard TTL levels. The encoder/compressor 30A may have sufficient drive to operate into 50 ohm or 75 ohm coaxial lines. The video signal fed to the encoder/compressor 30A should be a standard black and white signal with one volt peak-to-peak amplitude suitable for termination with 75 ohms.

The encoded and compressed signals may then be input to an encryptor 32A. The encryptor 32A is used if encryption is desired to prevent unauthorized access to the signals being transmitted. After encryption, the signals to be transmitted are then input to a modem 34A, which then performs the operations necessary to send the signals on a telephone line.

When the modem 34A receives signals, they are input to a decryptor 36A. The decryptor 36A provides a signal output to a decoder/expander 38A, which is connected to the desktop computer 26A. The decoder/expander 38A decodes the signals and expands them in a form suitable for input to the desktop computer 26A. The received signals are then displayed on the display 28A, which may be any display device, such as a video monitor, suitable for connection to the computer 26A to display the video images.

FIG. 2 is a block diagram of a second work station 20B that may be included in a teleconferencing network. The components of the work station 20B may be substantially identical to the corresponding components of the work station 20A. A modem 34B is connected to a telephone line to receive signals from a source such as the first work station 20A, for example. The received signals are input to the decryptor 36B. The output of the decryptor is input to the decoder and expander 38B, which decodes the signals and expands them from the compressed code used for transmitting the signals. The decoded and expanded signals are then input to the desktop computer 26B, which controls application of the signals to the display 28B.

The invention can take several forms, depending on the nature of the system to which it is added. In the most integrated form of the invention, a computer already equipped with a camera, monitor, and frame grabber card sends television pictures from a camera or another video source to one or more remote computers similarly equipped. If two or more terminals are similarly equipped, the video portion of a teleconference is established. The audio portion can be handled by telephone or by the addition of an extra bit to the digital signal to account for it in transmission. The output signal from the sender requires no return; therefore, the system can be used in the "broadcast" or one-way mode. Any sender can send data between pictures, or can cause the system to switch modes into high-speed text, high resolution graphics, or facsimile modes, and all receivers in the network will switch automatically to accommodate such data. The picture screen will reproduce the last picture sent, refreshed at a rate similar to standard television, until a new picture is received.

The sender may send a full picutre or a split screen image, with the two sides of the picture displaying the camera output, the picture sent, or the picutre received. If a split-screen image is sent, picture replacement will occur at roughly twice the rate given for a full-screen image.

Adaptive controls are provided to allow the sender to optimize motion rate, gray scale, and horizontal resolution as desired; any and all receivers will automatically adjust to decode and display the picture sent.

The invention is compatible with data networks including the integrated switched data network (ISDN) and encryption apparatus. Increasing the bit rate above 56 Kbaud increases the picture quality and/or picture motion rate. Decreasing the bit rate below 9600 baud increases transmission times for pictures.

The invention integrates teleconferencing and sending of standard video images with desktop computers and provides compatibility with systems not involving such computers. The invention provides lower potential cost and allows greater flexibility when other transmission modes are required in the context of a teleconference.

The protocol for sending the video signals is implemented as an adaptive system, which adjusts gray-scale and horizontal resolution on a line-by-line basis to provide the best possible picture without overloading the transmission channel. The digital transmission signal preferably is a continuous fixed rate binary digital data stream. Signals transmitted include picture lines and data lines. Each picture line represents a physical line of picture information. Data lines are transmissions not intended to be part of the reconstructed picture and are sent between picture lines.

Each line comprises a 12-bit start-of-line code, a 10-bit format code, fill bits (if present), a fill terminator bit, fixed or variable length pixel codes of a number indicated by the format code and tail codes, if present.

If the user-seletable full-scale horizontal resolution is selected correctly, most picutres can be sent with a minimum use of lower-resolution fallback modes. Frame or field subsampling can be used to get higher picture quality at a lower bit rate if higher resolution is desired than can be obtained at the bit rate selected. The variable frame/field transmission rate is generally set to operate in the highest resolution mode only, transmitting a new picture any time the channel can accept another. When either type of picture subsampling mode is used, the decoder displays the last picture received until it is replaced during vertical blanking with a new one.

The protocol is delta-coded in the horizontal direction only; therefore, no degradation of vertical resolution occurs at any bit rate or adaptation. Similarly, no interframe coding is used, which might cause blurring of objects in motion. If motion blurring is seen on the decoded picture, it is due to motion blur on the original signal. If motion artifacts are unacceptable, a shuttered camera must be used. If motion rates higher than 60 per second are required, several extensions of the protocol intended for transmission of color or anaglyphic images may be used.

When high-resolution measurement of the space between two objects or the distance between an object and either edge of the screen is critical and the resolution of the original picture is high enough to warrant it, pixel stagger (also called pixel interleaving) can be engaged. When line stagger is engaged, the beginning pixel on even-numbered lines in a single field is delayed by one half pixel period on the original encoding and on the display. Objects that are at least two lines tall in any field can thus be resolved in horizontal postion by half a pixel period, creating up to 1800 distinct locations when 900 pixel per line transmission used. The resolution thus obtained, even with 256 pixels per line, generally exceeds that obtainable with analog transmission links and analog tape recorders and many CCD-based cameras. If the original signal is a pixilated image with relatively few pixels per line (e.g. 320), pixel stagger may be a disadvantage. A test with the actual camera to be used is advised in such cases. A second type of interleaving delays all pixels in the even field with no delay in the odd field, which provides maximum vertical and horizontal resolution on non-moving or certain slowly-moving objects. If pixel stagger will not be used for a specific unit, the encoders may be formed without the feature. Decoders generally should include the pixel stagger feature whether it is used or not, because decoders often are used for several applications.

The signal is a highly-compressed version of the original analog video signal. As such, it consists of variable-length words and lines to make best use of the data channel. Long runs of ones and zeros can result from the compression algorithm. The distribution of ones and zeros is not symmetrical in the ensemble nor on short runs. As a consequence, bit slippages and lack of low-frequency response can introduce system errors and decrease overall data quality. Consequently, a stable clock frequency is required on systems where data dropouts may occur. Randomization or encryption of the type that will produce normal transition densities for any data and remove DC components is preferred. Experimentation has shown, however, that operation in an AC-coupled system without randomization is possible.

The protocol allows transmission of data not intended to be part of the picture display in two ways. One or more lines of data may be transmitted in between fields of the picture. The number of lines transmitted is fixed at the time of manufacture of the encoder. Line length, which can be from one to 1024 bits per line may be fixed or varied depending on the type specified. Loading of the data on data lines is serial, with a strobe/clock stepping in the data serially from an external user-supplied buffer. External buffer fullness can be used to modify the number of bits transmitted on any set of lines. When the number of bits per line is allowed to vary, the change in line length transmitted on bits 43 to 52 of the vertical channel pertain to the transmitted page that follows, not the data lines transmitted at the end of that page. If more than one data line is used, all must be of the same length. A single data line of 1024 bits and a 60 page/second rate (no field skipping) produces 61,440 bits/second. A 933-bit line under the same conditions can supply a basic data or voice signal which is called a type T-0 signal in the digital telephone signal hierarchy. Multiple lines can be used for multiple audio or higher-quality audio transmissions.

Use of data lines does not degrade picture quality, but if data lines are added and data rate kept constant, the picture will use fallback compression modes with greater frequency. A decoder not equipped to deal with data lines will ignore them and output a normal picture. A separate data-line-only decoder, which recognizes the data line synchronization code can be built fairly easily as a computer peripheral. If clock and data are fed into such a device, it needs only to know the data line length.

Bit one of the format word that follows the horizontal synchronization character is used ot produce a data channel which has one bit per picture line, or 240 bits per page. Bit one in data lines, if present, is not considered to be part of the vertical channel thus defined. Some of the vertical channel bits are constrained or serve various housekeeping channels; others are available to the user for external parallel inputs if specified at the time of encoder manufacture. Vertical channel bits 61–98 are assigned for use in transmitting time codes; bits 101–238 may be used for other data. In normal use, the vertical channel variable bits are latched by the encoder immediately before the start of transmission of a page, thus the time reported will be the time at the start of the picture transmitted. When this parallel latch is not specified, the user must supply timing to assure that a parallel word fed to the vertical channel and transmitted serially at a nominal 14,400 bits/second rate will be valid as decoded. Decoders not equipped to output vertical channel data will ignore such data if present.

The protocol allows transmission of data signals added to the input picture and intended to be part of the picture so long as those signals are not wholly or partially located within the vertical or horizontal blanking interval. Vertical edge coding is supported. Horizontal data codes in picture lines below line 23 are removed by the encoding process and cannot be used for data transmission.

The user must determine the bit and pixels per line when setting up the encoder. The standard supports pixel-per-line resolutions from 128 to 900, although not all choices may be present on actual units. This selection is not arbitrary, although the decoder will automaticlly determine what is being sent and adjust to decode and display it accordingly. The user also determines the date rate, either by selecting any of the several internal clock rates available on the encoder, or by feeding the encoder an external clock if the encoder is to be driven in synchronization with something else such as the camera, a computer, a channel bank, etc. The user selects whether pixel stagger (also called horizontal interleavings) is to be engaged.

Since the system is adaptive, it strives to present the best picture possible given the highest rate needed for any combination. It is assumed that the eight possible brightness changes allowed, which can be represented by a three-bit number (because eight is two to the third power), are distributed in such a way that entropy coding is at least as good as sending the codes as three-bit numbers. A complex or "busy" picture requires about 2.2 bits per pixel for an encoded picture. The bit rate needed for any given horizontal resolution is calculated by taking the 23-bit overhead on each line (12-bit sync, 10-bit format, one-bit fill terminator plus three times the number of pixels per line, and multiplying the result by 240 (the number of lines transmitted per field) and multiplying that result by 60 (nominal number of fields per second). The calculations give the following results:

| Pixels/line | Required bit rate |
|---|---|
| 900 | 39,211,200 |
| 640 | 27,979,200 |
| 512 | 22,449,600 |
| 450 | 19,771,200 |
| 320 | 14,155,200 |
| 256 | 11,390,400 |
| 225 | 10,051,200 |
| 160 | 7,243,200 |
| 128 | 5,860,200 |

The encoder system, when operating on a totally black screen input, uses only one bit per pixel because of the entropy codeing since "no change" is the most likely value of the "next" pixel and each line starts at black. These values are;

| Pixels/line | Required bit rate |
|---|---|
| 900 | 13,291,200 |
| 640 | 9,547,200 |
| 512 | 7,704,000 |
| 450 | 6,811,200 |
| 320 | 4,939,200 |
| 256 | 4,017,600 |
| 225 | 3,571,200 |
| 160 | 2,635,200 |
| 128 | 2,174,200 |

These values were calculated for the nominal 60 Hz vertical sweep values, which are allowed a ± 1% tolerance. Variations in the vertical sweep rate will change the numbers shown. Variations in the horizontal rate, which are allowed a greater tolerance because of the presence or absence of interlace, will not affect these numbers. If tail codes or data lines are added, these figures will, of course, increase acordingly.

When the picture gets too "busy" to allow full resolution at the given pixel rate, the encoder goes first to a more coarse quantization by reducing the number of steps in the gray scale on a line-by-line basis, then swithing to a two-bit-per-pixel code wtihout entropy and finally switching to a horizontal subsampling which decreases the number of pixels per line by a factor of two. Thus the number of bits per pixel is fixed at two. The extra bits available at a rate higher than required, or at rates higher than required by the fallback mode engaged, are "fill" bits added to selected lines to make the data rate stay constant. At the lowest resolution fallback mode rate (i.e., two bits per pixel, horizontal subsampling), if engaged for all lines, the minimum data rates will be the same as the first table above.

On any real picture, the required number of bits will be somewhere between the two sets of values, since almost any picture contains areas where there are no contrast changes. Consequently, for a given number of pixels per line, a bit rate between the minimum and maximum values shown in the tables above is the proper choice; experimentation with the system with the actual input picture will determine what will work most optimally. Thus a system with a 5.1 Mbit/second data rate will produce a slightly better picture than one with a 5 Mbit/second rate. No specific rate is best for all operational conditions. The system can be used on whatever rate is available that will cause an acceptable picture given the setting of the pixels-per-line switch and frame/field subsampling rate if the latter is used. In systems such as the digital telephone hierarchy, where bit rates are determined and the clock signal supplied by the channel bank, the bit rate used is dictated by the system. When the bit rate is controlled by a source unavailable to the distribution system, a multiplexer is required to provide the proper interface to the digital network.

With frame-and field-subsampling the channel bit rate may be greatly reduced with loss of temporal resolution. Field subsampling is preferred if the input picture has any motion in it. Since the reduced temporal resolution rate allows greater latitude for horizontal resolution, the tradeoff should be considered. Sending alternating fields (i.e., every second field) reduces the motion rate to 30 per second, which is still higher than motion picture film.

Variable field subsampling may be used when full horizontal resolution is desired but motion is not a serious concern. When variable subsampling is engaged, a full resolution, entropy coded picture is sent at the fixed data rate. No new picture is sent until a complete picture can replace the last one sent in the encoder buffer. The decoder, as in fixed subsampling, displays the last complete picture received until the next one is received, and switches to the next picture during vertical blanking. Because entropy coding is used, the time required to send a picture is a function of the data rate and picture complexity, but should generally be less, as much as one-third the time, necessary to transmit a picture at 3 bits per pixel. For a 256 pixel/line picture, and assuming three bits per pixel, a single field contains $(23 + [256 \times 3] \times 240 + 189,849$ bits. At one bit per pixel there are 66,000 bits. At the 56 kb/s rate proposed for ISDN, pictures could be transmitted at a rate of one every two seconds or so. At the T-1 rate of 1.544 Mbits/second, about ten pictures could be transmitted per second, approximating what many teleconferencing systems do.

When the channel to be used dictates the bit rate, the system can be externally clocked to operate at whatever data rate is available. Systems made to the specification can be made to operate at much higher rates, including the standard T-3 rate of 44.736 Mb/s. The signal produced by the encoder does not produce long runs of zeros, which can cause trouble in maintaining synchronization. Long runs of ones are possible, but they do not cause a synchronization problem because of the alternating polarity on ones in such a system.

At the 44.732 Mb/s rate, a 900-pixel/line signal can be sent, which is about twice the resolution available with good NTSC equipment. With pixel stagger, resolution of 1800 points is possible. Even at this highest resolution rate, two pixels can differ by the maximum jump value, or nearly half the distance from full black to white. Under normal circumstances, color or 3-dimensional black-and-white images of very high resolution should be transmittable at the T-3 rate as well. To take full advantage of the color resolution available, RGB signals must be used for entering data into and receiving data out of the system.

The structures and methods disclosed herein illustrate the principles of the present invention. The invention may be embodied in other specific forms without departing from its spirit or essential characteristics. Therefore, the described embodiments are to to be considered in all respects as exemplary and illustrative rather than restrictive. The appended claims rather than the foregoing description define the scope of the invention. All modifications to the embodiments described herein that come within the meaning and range of equivalence of the claims are embraced within the scope of the invention.

What is claimed is:

1. Apparatus for adapting video and digital signals to a computer in a telecommunications system to allow a plurality of terminals to engage in teleconferencing via a digital data network, comprising:

video input means for forming a standard video signal;

a frame grabber connected to the video input means;

a computer connected to the flame grabber to receive the video signal;

means connected to the computer for encoding and compressing the video signal and producing a continuous, fixed rate digital data stream output signal that comprises a first sequence of picture lines to define a first picture to be transmitted having a gray scale, and for controlling horizontal resolution, and for controlling the update rate for the first pictures transmitted;

means having an output connected as an input to said computer, for decoding and expanding digital signals from said data network, said means including a buffer for storing the first sequence of picture lines that comprise the first picture received by the means for encoding until the means for decoding receives a second sequence of picture lines that comprise the second picture received; and modulator/demodulator means for interfacing the output of the means for encoding and compressing and the input to said means for decoding and expanding with the digital data network.

2. The apparatus of claim 1, further comprising encryptor means connected between the means for encoding and the modulator/demodulator means.

3. The apparatus of claim 1, further comprising a display means coupled to the computer for displaying the video signals decoded by the decoder means.

4. The apparatus of claim 1, further comprising decryptor means connected between the modulator/demodulator means and the means for decoding.

5. The apparatus of claim 1, further comprising means for adjusting the gray scale and the horizontal resolution of the video signal on a line-by-line basis to optimize picture quality without overloading the digital data network.

6. The apparatus of claim 1 wherein the means for encoding includes means for controlling the gray scale in the video signal transmitted in response to the number of bits per pixel in the picture for a selected rate of transmission of the picture lines.

7. The apparatus of claim 1, further comprising means for interleaving non-video information with selected picture lines.

8. A method for adapting video signals to a computer for a telecommunications system to allow a plurality of terminals to engage in teleconferencing via a digital data network, comprising the steps of:

forming a standard video signal;

arranging a frame grabber to receive the video signal;

connecting a computer to the frame grabber to receive the video signal therefrom;

connecting encoder means to the computer for compressing the video signal and producing a continuous, fixed rate digital data stream output signal that comprises a first sequence of picture lines to define a first picture to be transmitted having a gray scale, and for controlling horizontal resolution, and vertical resolution;

connecting decoder means to the computer, the decoder means including a buffer for storing the first sequence of picture lines that comprise the first picture received by the encoder means until the decoder means receives a second sequence of picture lines that comprise the second picture received; and interfacing the output of the encoder means with the digital data network by means of a modulator/demodulator.

9. The method of claim 8, further comprising the step of connecting encryptor means between the encoder means and the modulator/demodulator means.

10. The method of claim 8, further comprising the step of coupling a display means to the computer for displaying the video signals decoded by the decoder means.

11. The method of claim 8, further comprising the step of connecting decryptor means between the modulator/demodulator means and the decoder means.

12. The method of claim 8, further comprising the step of adjusting the gray scale and the horizontal resolution of the video signal on a line-by-line basis to optimize picture quality without overloading the digital data network.

13. The method of claim 8, further comprising the step of adjusting the gray scale in the video signal transmitted in response to the number of bits per pixel in the picture for a selected rate of transmission of the picture lines.

14. The method of claim 8, further comprising the step of providing a controllable update rate for the first and second pictures received.

15. The method of claim 8, including the step of controlling the gray scale in the video signal transmitted in response to the number of bits per pixel in the picture for a selected rate of transmission of the picture lines.

16. The method of claim 8, including the step of interleaving non-video information with selected picture lines.

* * * * *